US012795268B2

(12) United States Patent
Berger et al.

(10) Patent No.: US 12,795,268 B2
(45) **Date of Patent: *Nov. 10, 2026**

(54) OPTICAL LINK DIAGNOSTIC SYSTEM

(71) Applicant: Google LLC, Mountain View, CA (US)

(72) Inventors: Jill Berger, Saratoga, CA (US); Kevin Yasumura, Lafayette, CA (US); Xiang Zhou, Sunnyvale, CA (US); Pedram Z. Dashti, San Jose, CA (US); Ryohei Urata, San Carlos, CA (US)

(73) Assignee: Google LLC, Mountain View, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/537,005

(22) Filed: Dec. 12, 2023

(65) Prior Publication Data

US 2024/0137674 A1 Apr. 25, 2024

Related U.S. Application Data

(63) Continuation of application No. 17/363,532, filed on Jun. 30, 2021, now Pat. No. 11,910,134.

(Continued)

(51) Int. Cl.

*H04Q 11/00* (2006.01)

*G02B 6/35* (2006.01)

(Continued)

(52) U.S. Cl.

CPC ....... *H04Q 11/0005* (2013.01); *G02B 6/3518* (2013.01); *G02B 26/0833* (2013.01);

(Continued)

(58) Field of Classification Search

CPC .............. H04Q 11/0005; G02B 6/3518; G02B 6/0833; G02B 27/30; H04B 10/0795

(Continued)

(56) References Cited

U.S. PATENT DOCUMENTS 2,006,019 A * 6/1935 Holesworth .......... G01F 11/261 222/454

7,787,772 B2 8/2010 Ota (Continued)

FOREIGN PATENT DOCUMENTS

CN 1655481 A 8/2005

CN 103973363 A 8/2014

(Continued)

OTHER PUBLICATIONS

Zhang et al; Review on Chaotic Lasers and Measurement Applications; Jun. 2021, Journal of light wave technology, pp. 1-13. (Year: 2021).*

(Continued)

*Primary Examiner* — Amritbir K Sandhu

(74) *Attorney, Agent, or Firm* — Lerner David LLP

(57) ABSTRACT

An optical links diagnostic system (LDS) and its operation within an optical circuit switch (OCS) for measurement and diagnosis of fiber-optic network fiber performance and quality is disclosed. The LDS can contain two photodetectors, a laser source, and be coupled to an OCS. Optical circulators can further be linked to the OCS. The LDS can be used both as an optical time domain reflectometer (OTDR) or as an optical return loss (ORL) meter and can automate the diagnosis of the fiber optical network fiber insertion loss and return loss.

18 Claims, 13 Drawing Sheets

Related U.S. Application Data

(60) Provisional application No. 63/110,651, filed on Nov. 6, 2020.

(51) Int. Cl.
*G02B 26/08* (2006.01)
*G02B 27/30* (2006.01)
*H04B 10/071* (2013.01)
*H04B 10/079* (2013.01)

(52) U.S. Cl.
CPC ........... *G02B 27/30* (2013.01); *H04B 10/071* (2013.01); *H04B 10/0795* (2013.01); *H04Q 2011/003* (2013.01); *H04Q 2011/0039* (2013.01)

(58) Field of Classification Search
USPC .............................................................. 398/9
See application file for complete search history.

(56) References Cited

U.S. PATENT DOCUMENTS

| | | | | |
|---|---|---|---|---|
| 8,676,004 | B1 * | 3/2014 | Urata | H04Q 11/0005 385/17 |
| 8,891,971 | B1 | 11/2014 | Liu et al. | |
| 9,185,475 | B1 * | 11/2015 | Liu | H04B 10/801 |
| 10,411,796 | B1 | 9/2019 | Archambault et al. | |
| 11,910,134 | B2 * | 2/2024 | Berger | H04B 10/071 |
| 2006/0198583 | A1 * | 9/2006 | Oikawa | H04Q 11/0005 385/53 |
| 2018/0364419 | A1 * | 12/2018 | Yasumura | G02B 6/3588 |
| 2019/0235929 | A1 * | 8/2019 | Altstaetter | G06F 15/80 |
| 2020/0257106 | A1 * | 8/2020 | Hu | B81B 7/02 |
| 2021/0088776 | A1 * | 3/2021 | Uyeno | B81B 3/0062 |
| 2022/0150606 | A1 * | 5/2022 | Berger | G02B 26/0833 |

FOREIGN PATENT DOCUMENTS

| | | | | |
|---|---|---|---|---|
| CN | 105871457 | A | 8/2016 | |
| CN | 109143605 | A | 1/2019 | |
| EP | 3415966 | A1 | 12/2018 | |
| WO | WO-2016107769 | A1 * | 7/2016 | H04B 10/071 |
| WO | 2018231308 | A1 | 12/2018 | |

OTHER PUBLICATIONS

Office Action for Chinese Patent Application No. 202110929472.5 dated Dec. 7, 2023. 5 pages.
Notice of Allowance for Chinese Patent Application No. 202110929472.5 dated Aug. 29, 2024. 5 pages.
Extended European Search Report for European Patent Application No. 21192329.7 dated Feb. 8, 2022. 10 pages.

* cited by examiner

OPTICAL LINK DIAGNOSTIC SYSTEM

CROSS-REFERENCE TO RELATED APPLICATIONS

The present application is a continuation of U.S. patent application Ser. No. 17/363,532 filed Jun. 30, 2021, which claims the benefit of the filing date of U.S. Provisional Patent Application No. 63/110,651 filed Nov. 6, 2020, the disclosures of which are hereby incorporated herein by reference.

BACKGROUND

Optical communications use modulated light beams to convey information through optical fibers, free space, or waveguides. Modern optical communication systems can contain a large number of optical fiber interconnections, which can number from thousands to hundreds of thousands, which must be managed. Management of these interconnections create difficulties in planning, deployment, and upgrading communication capacities.

An optical circuit switch (OCS) can be used to manage interconnections in optical communication systems. Functionally, an optical circuit switch may be considered an all-optical, 2D switching matrix that may direct light from any input fiber N to any output fiber M by changing the angles of the mirrors in one or more micro-electromechanical system (MEMS) mirror arrays. The OCS is typically implemented through a mechanical switching mechanism (electro-optical, thermo-optical mechanisms also exist), directing light beams between different ports in free space. Piezoelectric actuator technology can also be used to steer optical beams in free space between different ports. The switch is designed for low insertion loss over a broad wavelength range, so each fiber may carry many wavelengths as well as be bidirectional. The OCS may also be designed for fast, reliable switching by the MEMS mirror arrays. Optical performance requirements and optical signals can be limited by insertion loss, return loss, dynamic optical crosstalk, and static optical crosstalk.

The OCS can also be considered as a patch panel with N input ports and N (or another integer number) output ports. Any input port can be connected with any output port. An OCS can be programmed through software, allowing for fiber interconnections to be made in software, and managed more easily, enabling planning, deployment, and upgrading changes to the communication network more easily.

SUMMARY

Aspects of the disclosed technology enable the implementation of an optical time domain reflectometer (OTDR) or optical return loss (ORL) meter, referred to as a link diagnostic system (LDS), coupled with the OCS system for automated diagnosis of the fiber-optic network fabric insertion loss and return loss.

Aspects of the disclosed technology enable determination of transmission losses, reflection losses, and other link impairments within specific optical links connected to the OCS or optical pathway within an N×N optical circuit switch.

Aspects of the disclosed technology include a system, the system comprising an optical circuit switch (OCS), an optical circulator having a bidirectional port optically coupled to a port of the second fiber collimator; a first transceiver optically coupled to the optical circulator; a link diagnostic system comprising: a first photodetector and a second photodetector; a light source; an optical coupler or optical circulator, coupling the light source to the second photodetector. The OCS can comprise a first fiber collimator and a second fiber collimator and a core coupling the first and second fiber collimators. The first photodetector can be optically coupled to the optical circulator along a path comprising a fiber input to the first fiber collimator, the core, and the port of the second fiber collimator.

The system can further comprise a plurality of optical circulators optically coupled to a plurality of ports of the first fiber collimator and a plurality of ports of the second fiber collimator. The plurality of the ports of the first fiber collimator can comprise N input ports, the plurality of the ports of the second fiber collimator comprising N output ports, and 2N optical circulators optically coupled and in one to one correspondence with the N input ports and N output ports. The system of claim 1 can further comprise a second link diagnostic system, the second link diagnostic system comprising a first photodetector, a second photodetector, a light source, and an optical coupler. The second link diagnostic system can be optically connected to the OCS through the second fiber collimator. The system can further comprise a second optical circulator optically linked to the second link diagnostic system and a second transceiver. The OCS can further comprise microelectromechanical system (MEMS) mirrors. The link diagnostic system can comprise a discrete unit separate from the OCS.

The signal obtained from the first photodetector can be analyzed in conjunction with a signal obtained at the second photodetector. The light source is configured to generate an optical time domain light signal. A reflection signal can be used to determine the location of a source of signal loss and/or reflection along the path. A reflection signal can be used to determine the amount of signal loss and/or reflection across and/or within the entire optical path. The system can further comprise a memory containing instructions, the instructions when executed configured to control the optical core. The system can contain instructions which can further cause light generated from the light source to take all possible optical paths across the optical core and corresponding paths of the system. The instructions can be further configured to analyze signals to quantify or identify sources of optical losses and/or losses in the system. Instructions can also be sent from an external system to control or interact with the disclosed technology.

Aspects of the disclosed technology include systems, methods, and apparatuses for detecting signal loss in an optical fiber system, which can comprise: forming a path comprising a fiber input to a first fiber collimator, an optical core, and a port of a second fiber collimator; generating, at a first link diagnostic system, a first optical signal; transmitting, the optical signal through at least a portion of the path; receiving a portion of the first optical signal at a circulator connected to a port of the second collimator; receiving at a first photodetector of the first link diagnostic system a reflected portion of the first optical signal; and configuring the first photodetector to be coupled to the optical circulator.

The first optical signal can be a signal of substantially constant amplitude. The first optical signal can be an optical time domain signal.

The first optical signal can be generated by pulsing a light source at the first link diagnostic system. The method can determine the location of a source of signal loss and/or signal reflection along the path. The method can comprise generating calibration values. The method can comprise calculating optical loss values by using the calibration values. The method can further comprise comparing the reflected portion of the first optical signal to the first optical signal. The method can further comprise modifying a path taken by the first optical signal within the optical core. All possible optical paths can be taken by the first optical signal

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1:
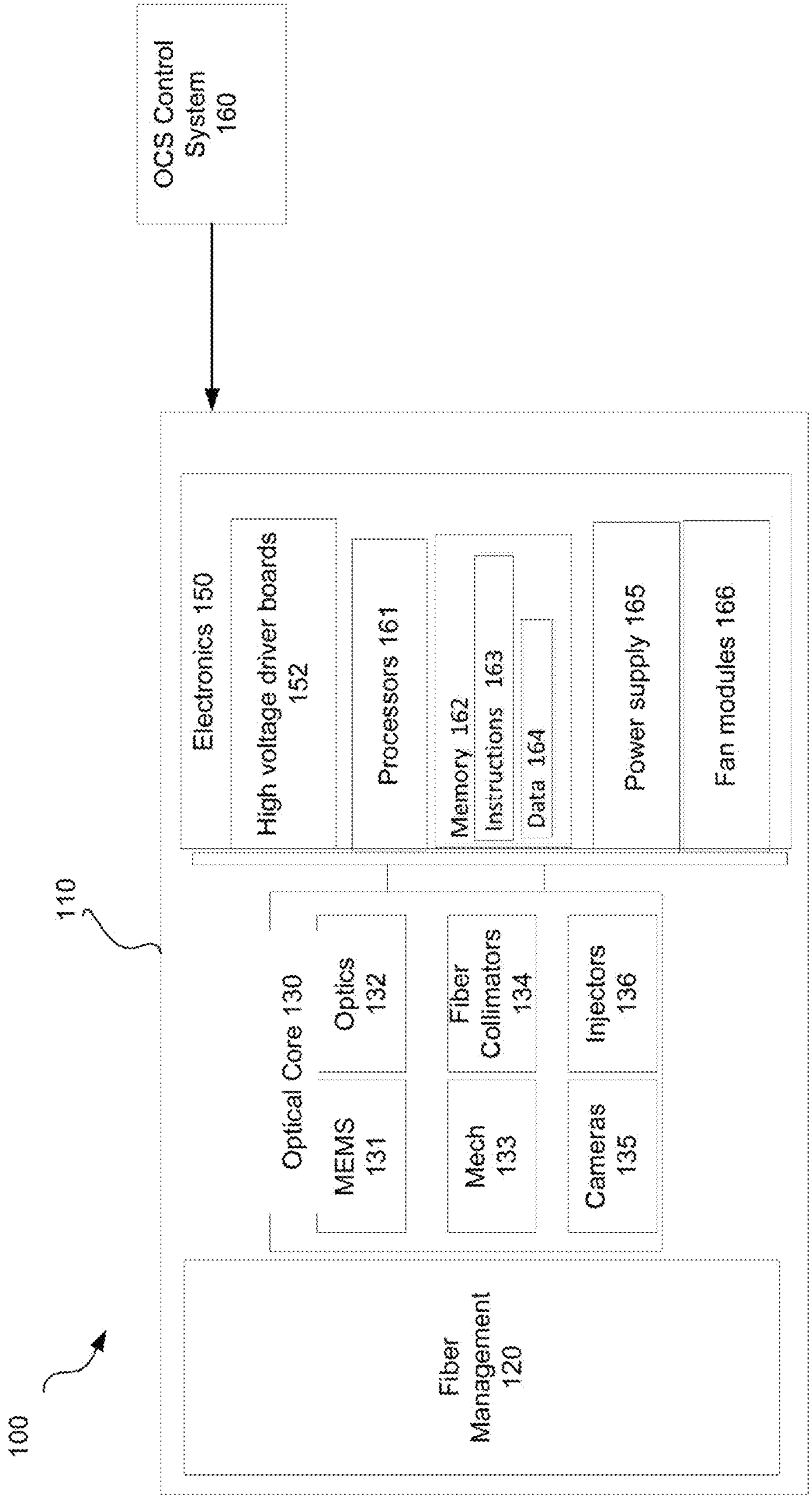
FIG. 1 is a block diagram of an example optical circuit switch according to aspects of the disclosure.

An optical circuit switch (OCS) allows for the transmission of data through the use of light and optical fiber. For some applications, such as within a datacenter or any other high interconnect count network, it is desirable to increase switch port count to meet bandwidth and interconnect count demand while maintaining the OCS infrastructure. Increasing switch port count may lead to signal degradation, which may impact performance. As switch port count increases, it is desirable to maintain signal quality and to be able to automatically diagnose signal degradation or performance issues. In that regard, the ability to use high throughput signal processing is impacted by degradation caused by fibers, transceivers, circulators, or other optical components related to the OCS system. In addition to signal degradation which can occur with an OCS due to dust, incorrect alignment, degradation of OCS drivers and electronics over time, temperature variations, dust, other sources of degradation of a signal can be present. Degradation of a signal sent over an OCS system can also be caused by the fibers, transceivers, circulators, or other components connected to the OCS externally, and/or back-reflection within an OCS data path or OCS data link. Aspects of the disclosed technology enable detection of degradation caused by the fibers, transceiver, and circulators connected to the OCS externally.

A link diagnostic system (LDS) can allow the above-mentioned and other sources of noise within an OCS system to be determined. An LDS can contain two photodetectors, a laser or other light source, and be coupled to an OCS. Optical circulators can further be linked to the OCS. In part, one photodetector can act as a sensor to understand the intensity of light transmitted by the laser, acting as a control for the laser within the LDS system, and the other photodetector can measure a percentage of signal being back-transmitted within the OCS system and externally connected components, such as a fiber, circulator, or transceiver.

The LDS can be used both in various modes or configurations. In some examples, the LDS system can be used as an optical time domain reflectometer (OTDR) while in other examples, the LDS system can be used as an optical return loss (ORL) meter. The LDS can also be used as a transmitter and receiver to measure loss along the various paths of the entire optical system.

Further, the LDS system can automate the diagnosis of the fiber optical network fiber insertion loss and return loss. In some examples, the LDS can be controlled in conjunction with the OCS to diagnose a subset of the optical links within an OCS. For example, within an N×M optical switch, N or M links can be diagnosed.

In some examples, the following equations can be referred to or utilized in connection with the analysis, collection, or calculation of various parts of the optical links or each optical link path.

Transmission Path Loss=LDS laser power−(fixed or calibrated loss value)−Transmission Reflection Power fixed/calibrated loss value (due to OCS itself)−receiver power at the transceiver.

Reflection path loss=Transmitter Power−fixed/calibrated loss value (due to OCS itself)−LDS receiver power Return loss=LDS laser power−fixed/calibrated loss value (due to OCS itself)−LDS receiver power

Example Systems and Methods

The following figures illustrate aspects of the disclosed technology. A person of skill in the art will understand that the various disclosed components can be coupled electronically by one or more of the disclosed electronics, processors, and computing devices to perform the methods and techniques disclosed herein. For simplicity and clarity, not every electronic or data link is illustrated or disclosed and a person of skill in the art will appreciate that various sensors, photodetectors, lasers, and other electronics can be controlled collectively and be in data connectivity with one another or one or more computing devices.

FIG. 1 illustrates an example OCS 100, such as may be used in datacenter. The OCS 100 includes a structure such as chassis 110 supporting a number of components. In a front of the OCS chassis 110 are optical fiber connections, such as fiber management block 120. The OCS 100 may further include an optical core 130. The optical core can also be referred to as the OCS internal optical path or OCS internal optical space. The optical core houses MEMS 131, fiber collimators 134, optics 132, cameras 135, and injectors 136 and other mechanisms 133. A rear of the OCS 100 includes electronics 150, such as high voltage driver boards 152 for the MEMS, one or more processors 161, such as a CPU board, one or more memories 162 storing executable software, and power supplies 165 and fan modules 166. The chassis 110 interfaces with OCS control system 160. While a number of components are shown, it should be understood that such components are merely non-limiting examples, and that other components may additionally or alternatively be included.

There may be any number of input fibers and output fibers connected to the front of the OCS chassis 110. Inside the chassis 110, these fiber fanouts are spliced to the fiber collimators 134.

The fiber collimators 134 are lensed fiber arrays. Just as one example, the fiber collimators 134 may include tens or hundreds or more fiber arrays. The fibers are assembled in a hole array that matches a MEMS array grid pattern, thereby forming a fiber array. The fiber array is attached to a mounting flange. A lens array is aligned and attached to the fiber array. Fiber and lens position errors are very tightly controlled.

The one or more processors 161 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of the OCS control system 160 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the OCS control system 160. Accordingly, references to a processor or computing device will be understood to include references to a collection of processors or computing devices or memories that may or may not operate in parallel.

Memory 162 may store information that is accessible by the processors 161, including instructions 163 that may be executed by the processors 161, and data 164. The memory 162 may be of a type of memory operative to store information accessible by the processors 161, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 163 and data 164 are stored on different types of media.

Data 164 may be retrieved, stored or modified by processors 161 in accordance with the instructions 163. For instance, although the present disclosure is not limited by a particular data structure, the data 164 may be stored in computer registers, in a relational database as a table having a plurality of different fields and records, XML documents, or flat files. The data 164 may also be formatted in a computer-readable format such as, but not limited to, binary values, ASCII or Unicode. By further way of example only, the data 164 may be stored as bitmaps comprised of pixels that are stored in compressed or uncompressed, or various image formats (e.g., JPEG), vector-based formats (e.g., SVG) or computer instructions for drawing graphics. Moreover, the data 164 may comprise information sufficient to identify the relevant information, such as numbers, descriptive text, proprietary codes, pointers, references to data stored in other memories (including other network locations) or information that is used by a function to calculate the relevant data.

The instructions 163 may be used to control components of the optical circuit switch described herein. It should be understood that the optical circuit switch may include other components which are not shown but may be utilized in execution of the instructions 163.

Figure 2A:
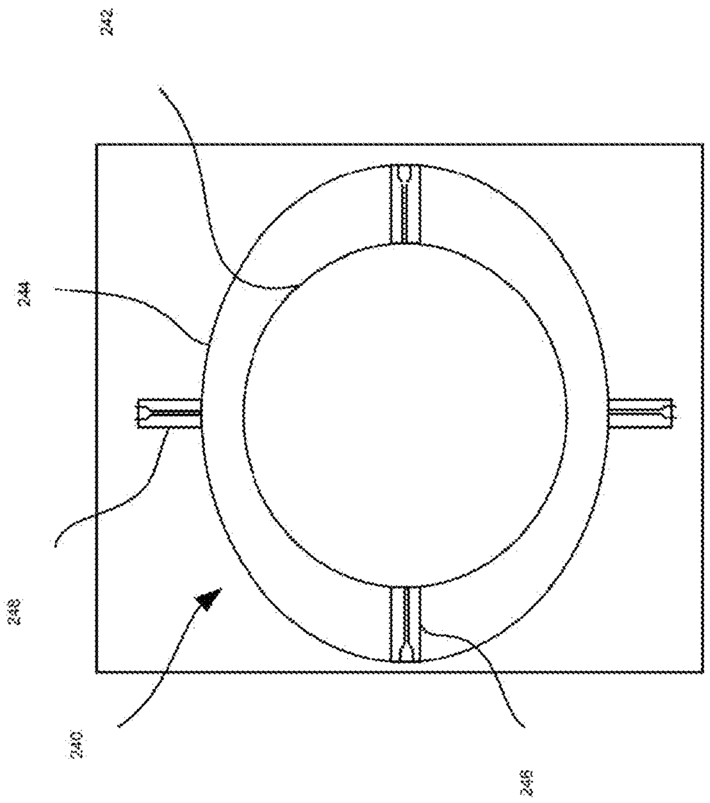
FIG. 2A is a diagram of a two-axis microelectromechanical system (MEMS) mirror assembly for use in an integrated optical assembly, according to aspects of the disclosure.

FIG. 2A illustrates an example MEMS mirror 240. The MEMS mirror 240 may be approximately 1 mm in size and highly reflective. For example, the MEMS mirror 240 may be coated with a highly reflective material, such as gold. The mirror 240 includes an inner portion 242 and an outer portion 244, wherein the inner portion is rotatable about a first axis and the outer portion is rotatable about a second axis. For example, the inner portion may rotate about inner torsion beams 246 actuated by a comb drive actuator. The outer portion may rotate about outer torsion beams 248 actuated by a comb drive actuator. The comb drive actuators may be high voltage, electro-static vertical comb drives which rotate the mirrors about the torsion beams. For example, the rotation may be approximately +/−1-10 degrees when a voltage ranging between 10s of volts to hundreds of volts is applied across the electrodes.

Figure 2B:
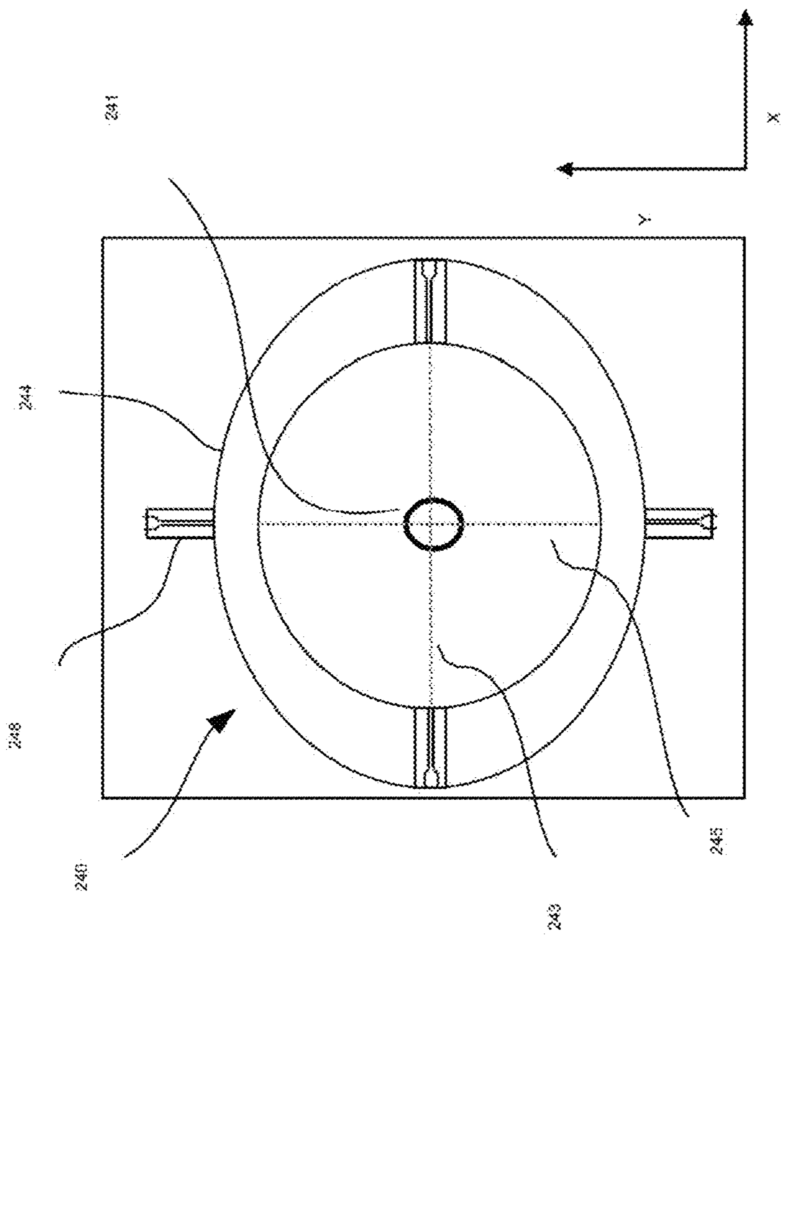
FIG. 2B is a diagram of a two-axis microelectromechanical system (MEMS) mirror assembly for use in an integrated optical assembly, according to aspects of the disclosure.

FIG. 2B illustrates additional aspects of MEMS mirror 240. FIG. 2B illustrates the centroid of MEMS mirror 240, centroid 241. Centroid 241 may correspond with the center of mass of MEMS mirror 240. For example, when the density of the MEMS mirror is uniform, the center of mass and the centroid 241 would be at the same location. FIG. 2B also illustrates a first axis 243 of rotation, such as an x-axis. Similarly, FIG. 2B illustrates a second axis 245 of rotation, such as a y-axis. Rotation of the MEMS mirror about either axis 243 or axis 245 may be achieved through rotating torsion beam 246 or torsion beam 248 respectively. By actuation of all torsion beams attached to MEMS mirror 240, it is possible to move MEMS mirror 240 in a direction perpendicular to the plane formed by the two axes of rotation, axis 243 and axis 245, such as a z-axis. Thus, the MEMS mirror may be moved in at least three independent directions. The movement of the MEMS mirror in these three independent directions may also be referred to as tip, tilt, and piston actuation of the MEMS mirror. The amount of movement of the MEMS mirror may be tracked by the movement of centroid 241 with respect to three independent axes, such as an x-axis, y-axis, and z-axis.

In some examples, it may be necessary to adjust the positioning of one or more MEMS mirrors, such as MEMS mirror 240. As an example, it may be necessary to remove a MEMS mirror out of the path of a light beam. As another example, it may be necessary to remove one of the MEMS mirrors out of the field of view of a particular camera. Removing a MEMS mirror from the camera field of view may be referred to as "parking" of the MEMS mirror. Parking may be achieved by applying voltages to the driver elements capable of moving a MEMS mirror. However, the high voltage required to park a MEMS mirror may damage the driver elements associated with the MEMS mirror through more stress on electronic components and aging, increasing the likelihood of failure in the future. Additional methods and apparatuses to prevent the interference caused by an unwanted light beam are discussed below.

Figure 3:
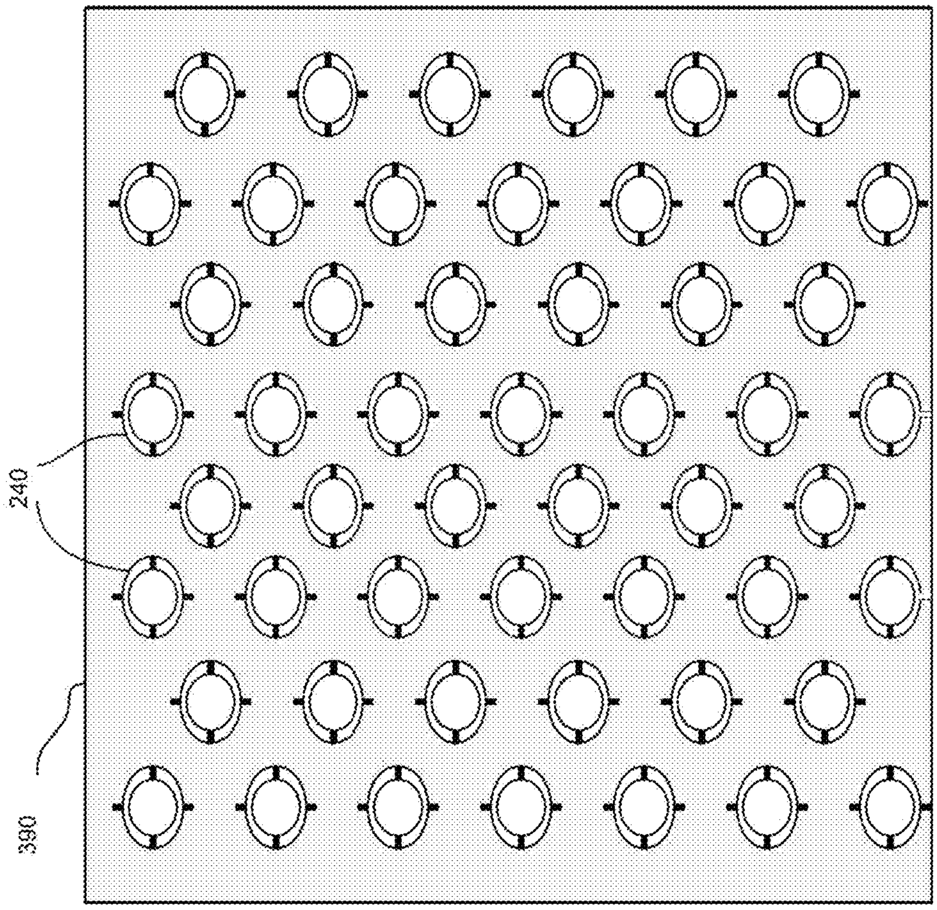
FIG. 3 is a diagram of a two-axis microelectromechanical system (MEMS) mirror assembly for use in an integrated optical assembly, according to aspects of the disclosure.

FIG. 3 illustrates an example die 390 including an array of MEMS mirrors 240. Accordingly to some examples, the MEMS die packages include MEMS mirror arrays, but in other examples any number of MEMS mirrors may be included. The die may be hermetically sealed inside a package with a window in its lid. Not all of the mirrors may be needed or used at a same time. For example, only the best mirrors and fibers in a MEMS mirror array may be selected to make an optical switch, which may be divided as a number of ports+several spares.

Figure 4:
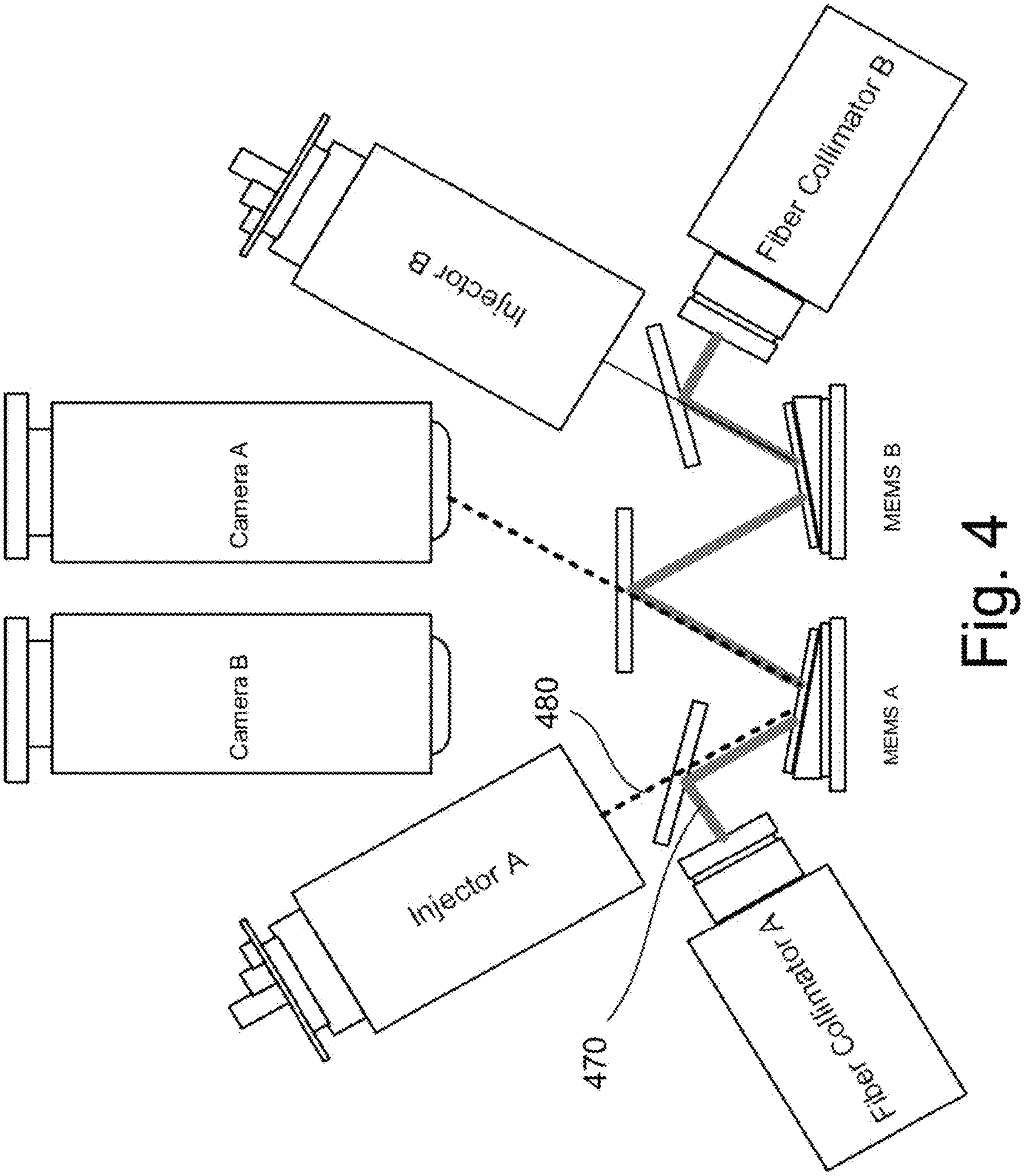
FIG. 4 is a diagram of an optical circuit switch, according to aspects of the disclosure.

FIG. 4 provides an example of a data optical path and a monitor optical path included in the optical core, also referred to as an optical link. In some examples, the optical link can refer to the entire path light takes, including external fiber, transceivers, and circulators. On data path 470, traffic comes in as light input to fiber collimator A. All of the optics in the data path 470 may be designed for very low loss over a variety of wavelengths. The light travels along this path 470, and is reflected from MEMSA, then from MEMSB, then is coupled to output fiber collimator B. MEMS A and MEMS B may be just two MEMS mirrors of a larger array, such as illustrated in FIG. 3 and explained above. By rotating the mirrors in the array, light from any input fiber may be coupled to any output fiber. The injectors shine small laser beams on the MEMS. The cameras image the beams reflected from the MEMS to measure the mirror positions.

Monitor path 480 does not carry data, but provides information to a mirror control system about the positions of the mirrors. This may be done using, for example, an injector to shine small beams on each of the MEMS mirrors, and a camera to view the positions of the beams reflected from the MEMS. There may be a camera/injector pair for each MEMS.

Figure 5:
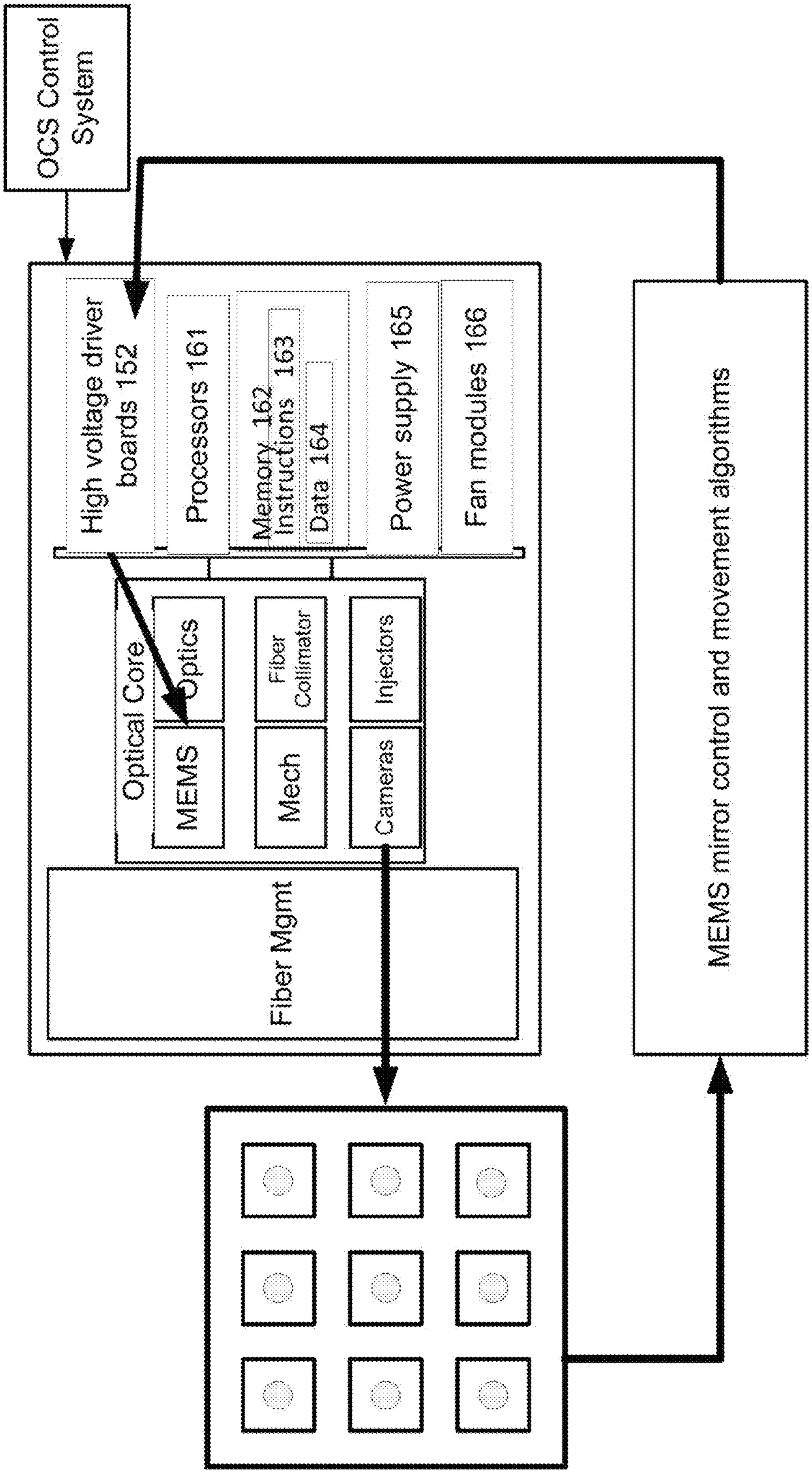
FIG. 5 is a diagram of a feedback in a mirror control loop according to aspects of the disclosure

FIG. 5 illustrates an example mirror control loop. The OCS control system 160 tells the OCS what configuration it should be in. The mirror control loop handles the MEMS mirror control and movement algorithms based on the monitor path data, and then tells the high voltage drivers to move the mirrors.

Figure 6:
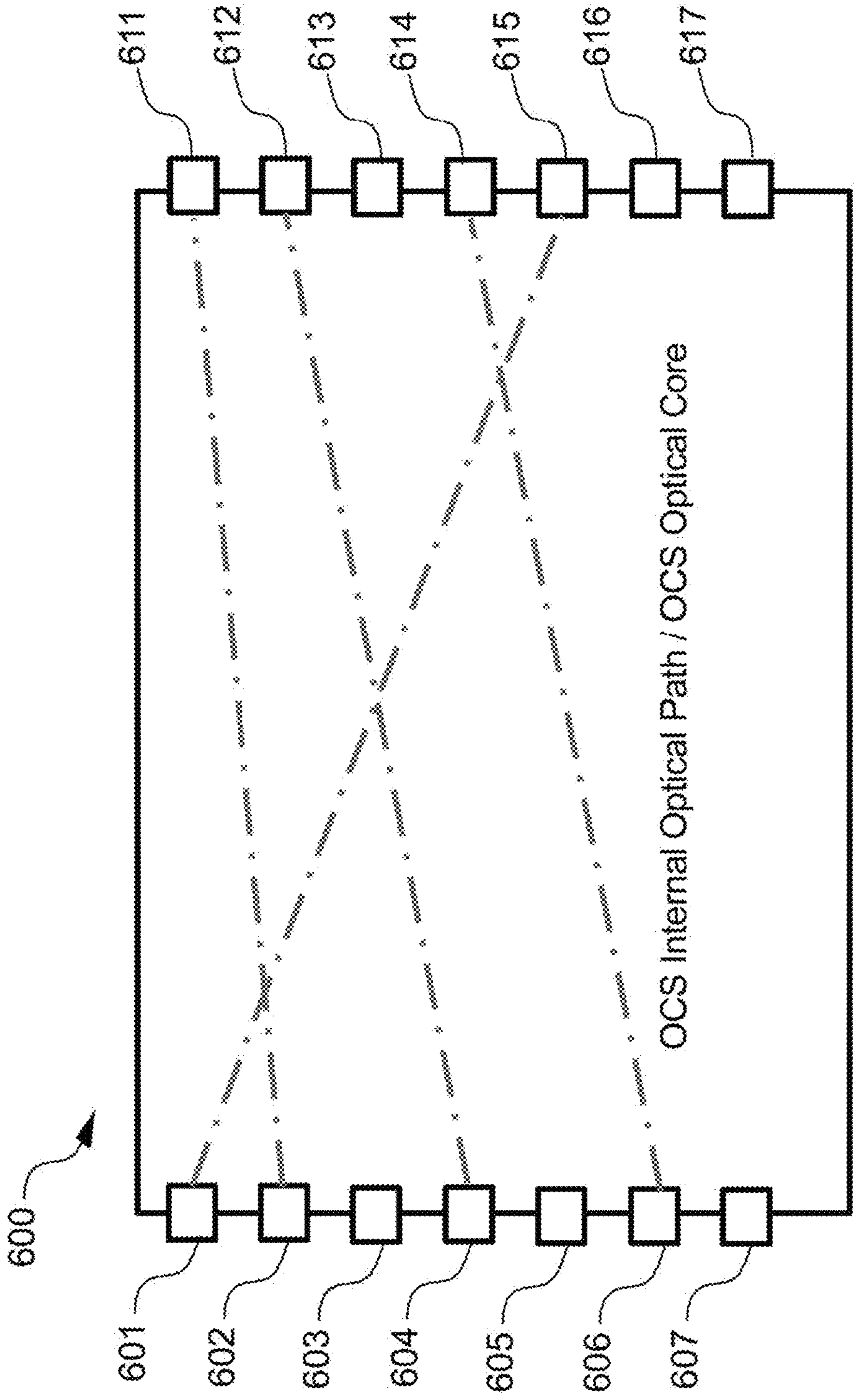
FIG. 6 illustrates a schematic of an N by N optical circuit switch according to aspects of this disclosure.

FIG. 6 illustrates a schematic of an N by N optical circuit switch (OCS) 600 switch according to aspects of this disclosure. FIG. 6 illustrates a number of ports, such as input ports 601-607 and output ports 611-617. In some examples, the input ports of FIG. 6 may be considered to be part of fiber collimator A of FIG. 4 while the output ports of FIG. 6 may be considered to be part of fiber collimator B—though these two diagrams do not necessarily need to be related. Although only a few ports are illustrated for clarity, an OCS switch can have an arbitrary integer number of ports, such as N input ports and M output ports. Each input port can be optically linked to any output port through an optical pathway, and vice versa. For clarity, a subset of the N by N optical links are illustrated in unlabeled dashed lines. These dashed lines can correspond to space within an OCS switch where light beams pass through. Although reference is given with input ports and output ports, a person of skill in the art will understand that the ports and signals transmitted through OCS 600 can be transmitted from output ports to input ports. Each port can be paired with an optical transceiver which is capable of both transmitting and receiving optical signals.

In some examples, mechanisms which can be used to control or operate OCS 600 can be similar to the systems and apparatus described in reference to FIGS. 1 to 5, such as OCS 100. Similarly, OCS 600 can be programmable as described above. In some examples, other mechanical switching mechanisms can be used to control the operation of OCS 600 and the particular optical pathway being used at a particular time, such as mechanical switching methods, including electro-optical and thermo-optical mechanism. One particular example, which has been described above with respect to MEMS mirror, uses an array of silicon mirrors which are tilted by applying a control signal or voltage signal to deflect optical beams in free space to different ports. Other examples can include piezoelectric actuator technology, which can be used to steer optical beams in free space between different ports.

OCS 600 can include any combination of components to improve the quality and performance of optical signals and reduce the amount of noise through an optical link Non-limiting examples of components or techniques which can be used include the use of low return loss connector technologies at optical connection points and ports, ultra physical contact connectors, and angled physical contact connectors.

OCS 600 can also transmit optical signals encoded in various protocols or methods. One example of a protocol which can be used with OCS 600 includes pulse amplitude modulation (PAM). Pulse-amplitude modulation is a method of signal modulation where information is encoded in the amplitude of a series of signal pulses. The duration of the pulses can be adjusted to encode additional information in a shorter period of time. Varieties of PAM include single polarity PAM and double polarity PAM. A person of skill in the art will appreciate that several techniques and protocols can be used in connection with the disclosed technology.

Figure 7A:
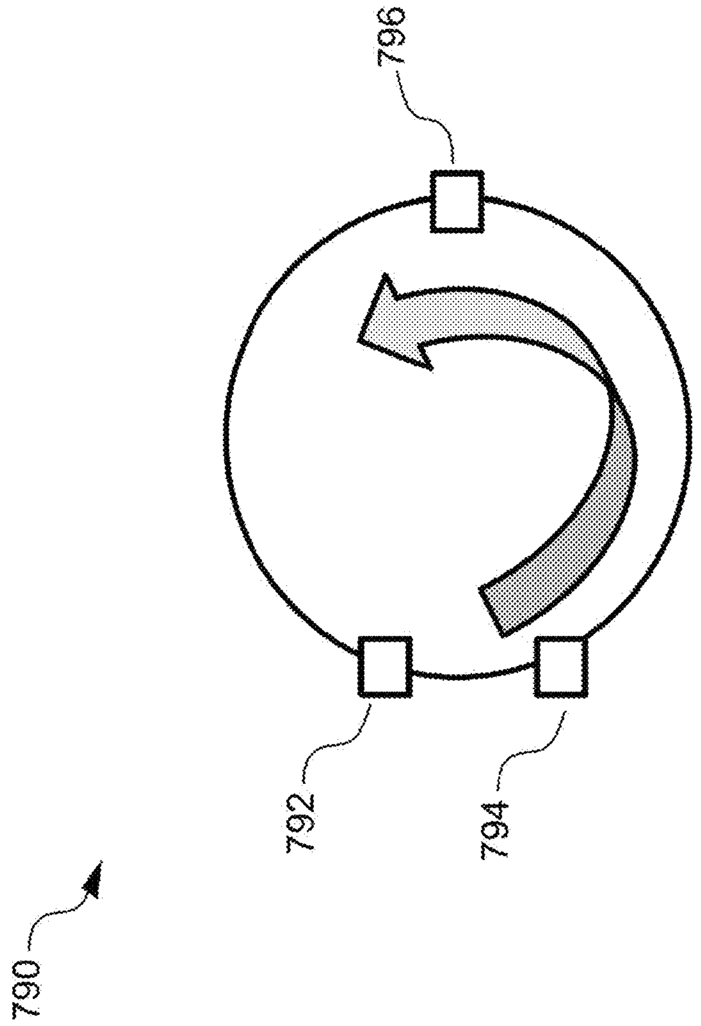
FIG. 7A illustrates an example optical circulator according to aspects of this disclosure.

Illustrated in FIG. 7A is circulator 790 can have a dedicated first port or a unidirectional output port 792 and dedicated second port or unidirectional input port 794, and a third port or bidirectional port 796. Circulator 790 can be an optical circulator, which is a three port device, which has cyclical connectivity. An input into the first port 794 is directed to the third port 796, an input into the third port 796 is directed to the second port 792. In this manner, optical circulator 790 can allow bi-directional transmission over a single fiber or a single optical path by propagating a signal received at the first port 794 through the third port 796, and from the third port 796 to the second port 792. Circulator 790 can contain optical polarizers, magneto-optical materials, and other optical components to achieve the functionality described with respect to circulator 790. Although FIG. 7A is described with reference to a first, second, and third port, any variation of the principles described with respect to optical circulator 790 can be used.

Figure 7B:
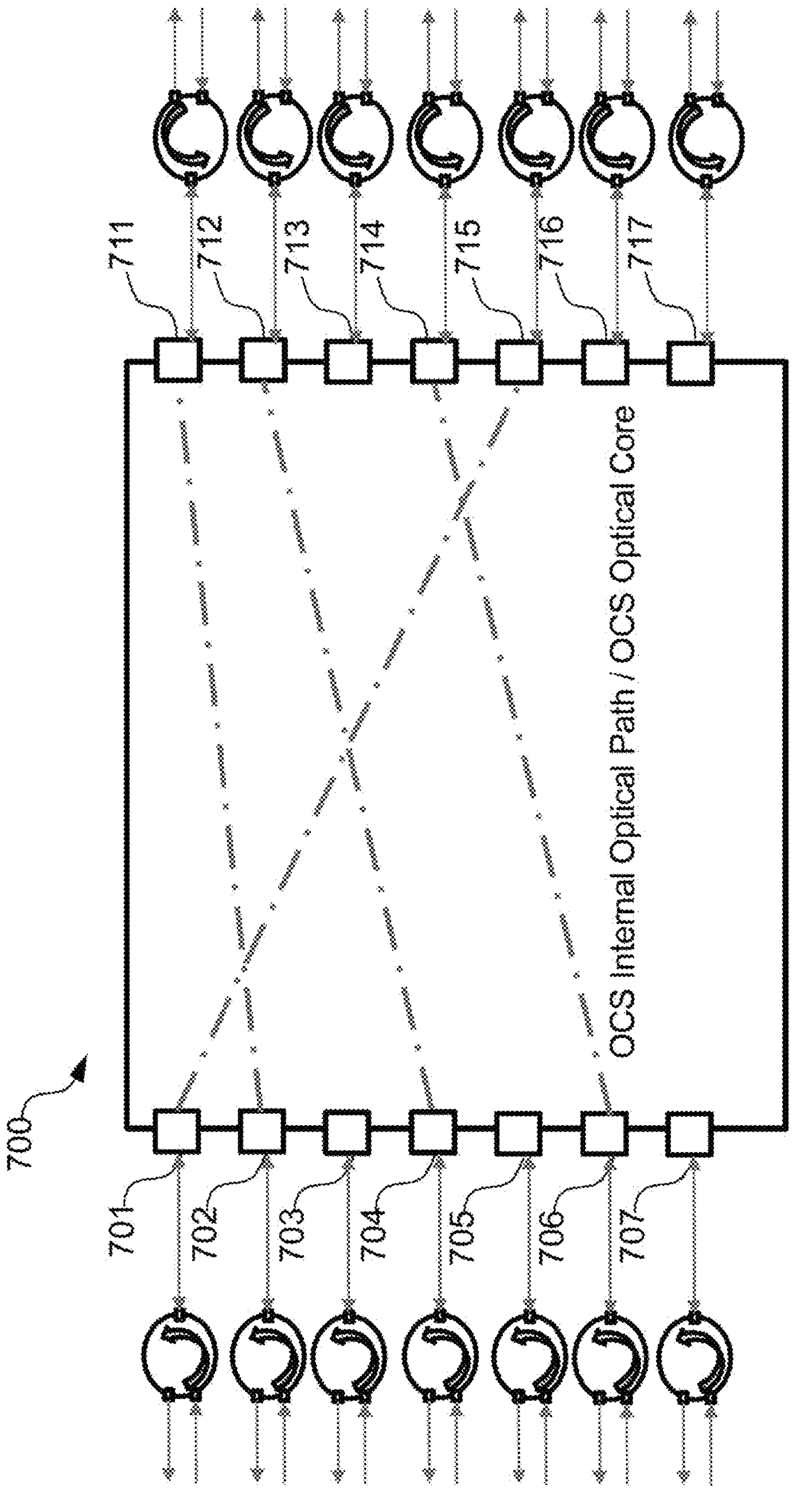
FIG. 7B illustrates an N by N optical circuit switch coupled with circulators on ports of the N by N optical circuit switch according to aspects of this disclosure.

FIG. 7B illustrates an N by N optical circuit switch (OCS) 700 coupled with circulators on ports of the N by N optical circuit switch. OCS 700 can be similar to OCS 600. FIG. 7 illustrates a number of ports, such as input ports 701-707 and output ports 711-717. Although only a few ports are illustrated for clarity, an OCS switch can have an arbitrary integer number of ports, such as N input ports and M output ports. Coupled to each port of OCS 700 can be a fiber-optic cable, represented by an unlabeled bidirectional arrow. One end of the fiber-optic cable can be optically linked to a circulator, such as circulator 790 illustrated in FIG. 7A. These circulators are illustrated but unlabeled in FIG. 7B for clarity.

As OCS switch 700 implements a passive optical path between the input and output port, this single path must be bidirectional or reciprocal, meaning light can pass in both directions along the path in a symmetric, similar manner More specifically, changes in amplitude and phase of the light signal are the same going from the input port to the output port or from the output port to the input port.

Given the symmetry described above, circulators can be combined with OCS 700. By the use of a circulator with each input and output port of OCS 700, each input and output port becomes a bidirectional port, which can double the number of ports in OCS 700 from N to 2N, creating the equivalent of a 2N by 2N optical switch. Although reference is given with respect to an N by N switch, a person of skill in the art will understand that the optical switches described herein can be any arbitrary number of integer switches.

Thus, an input to the input port of a circulator can be transmitted to a bidirectional port, which is in turn connected to an input port of OCS 700. Similarly, an output port of OCS 700 can be connected with the bidirectional port of a circulator, allowing an optical signal to travel from the output port of OCS 700, through an optical link, through the bidirectional port of a connected circulator, and through the output port of the circulator.

The bidirectional link described above can suffer from noise signals which are superimposed on top of the desired or intended transmitted optical signal. As one example of a source of noise are reflections in the optical path due to the optical links now being bidirectional. Other sources of noise, particularly within a commercial or typical use setting of OCS, can include fiber contamination, particulate matter, and dust on OCS reflectors or connector ends.

Figure 8A:
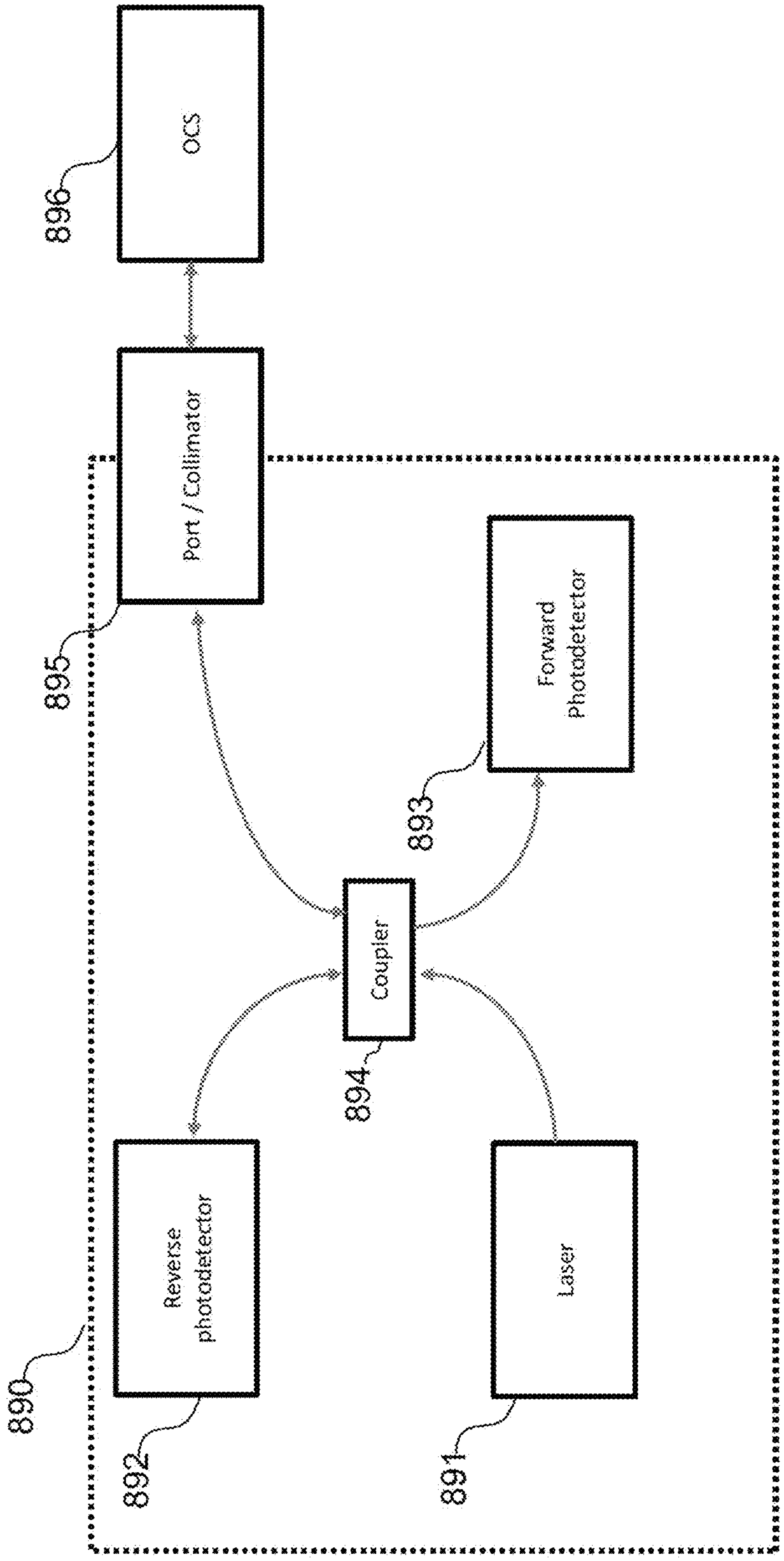
FIG. 8A illustrates a schematic view of an OCS with integrated LDS, consisting of a laser, 2 photodetectors (PDs) and a 2×2 coupler according to aspects of this disclosure.

FIG. 8A illustrates an example link diagnostic system, 890, coupled to an OCS 896. LDS 890 can consist of a laser 891, two photodetectors, photodetectors 892 and 893, a coupler 894, and a port 895. Coupler 894 can be a 2 by 2 coupler.

Laser 891 can be any light source, including but not limited to any combination of lasers, specially designed semiconductors. As one example, laser 891 can be a distributed feedback laser. Laser 891 can output a 1310 nm wavelength. The light generated by laser 891 can be optically linked to other components of LDS 890 as described below.

A photodetector, such as photodetectors 892 and 893, can be a semiconductor device that converts light into an electrical current. The photodetector can generate a current which is proportional to the number of photons hitting the surface. As electrical current is generated when photons are absorbed in the photodetector, the photodetector can act as a sensor for light. The photodetector can be any device which is capable of sensing intensities and/or wavelengths of light. Photodetectors 892 and 893 can be a photodiode or a photosensor. In some examples, a photodetector can be chosen to be more sensitive to specific wavelengths of light. Additional circuitry, calibration, or electronics can be incorporated into photodetectors 892 and 893 to ensure a better signal to noise ratio and reduce the effect of ambient light or noise.

Coupler 894 can couple 4 optical links or fibers within LDS 890. In some examples, the coupler can couple two chosen fibers or links. The coupler can help split the amount of light or percentage of signal between pathways within LDS 890, as illustrated in FIG. 8A. In some examples, an optical circulator can be used in lieu of or in conjunction with coupler 894.

Photodetector 892 can be a "return power monitor" which monitors a signal returned from an optical path, as further explained with reference to FIG. 8B. Photodetector 893 can be a "laser forward power monitor" signal which monitors the power of a laser as transmitted in the forward direction.

Port 895 can be a port of an OCS, such as OCS 600 or OCS 700. Laser light transmitted to port 895 and returned from port 895 can arrive at the photodiode 892 and be used to monitor a path. In some examples, port 895 can be part of a collimator of an OCS system, such as an optical link or optical fiber linking to a collimator.

Figure 8B:
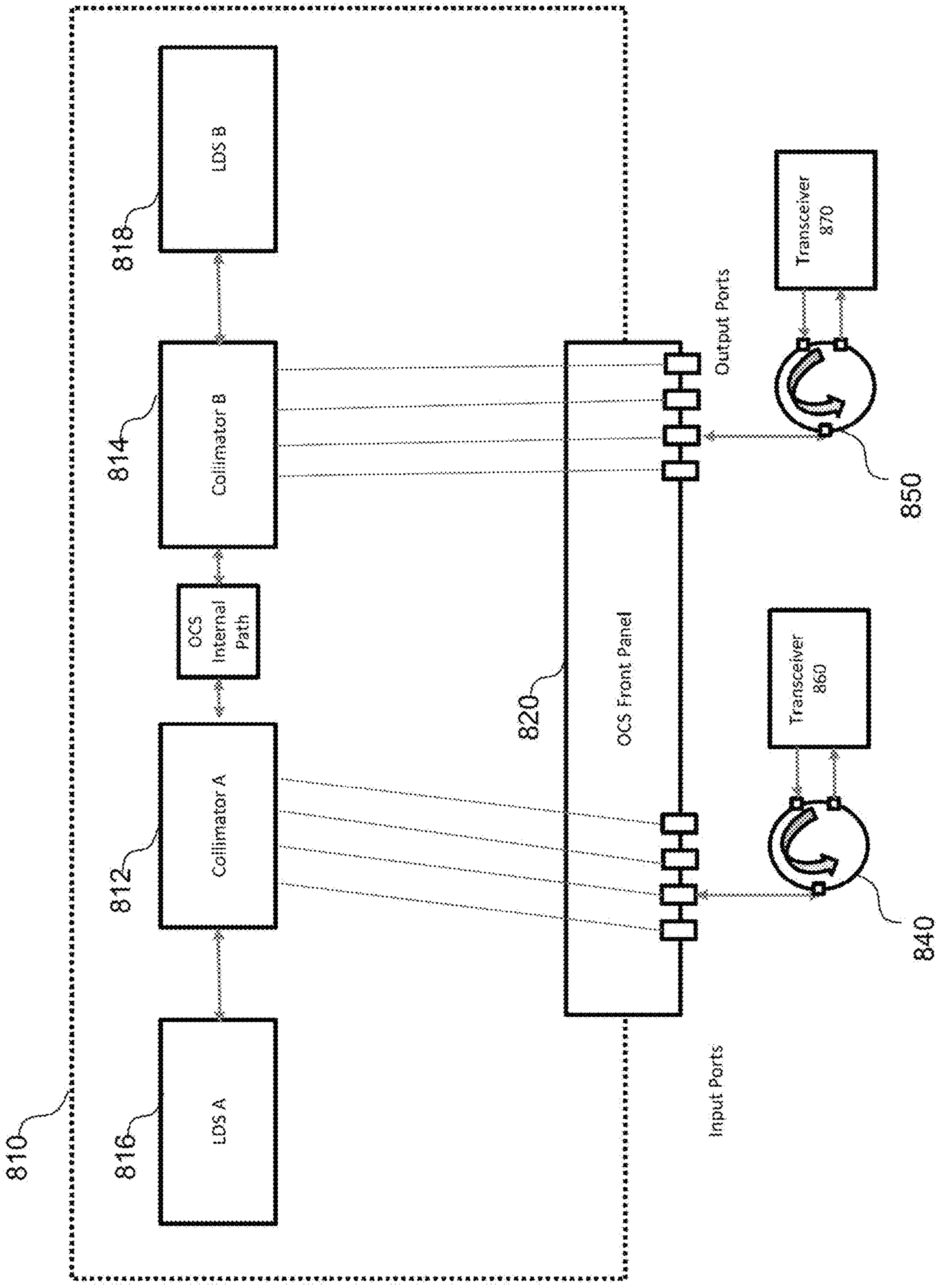
FIG. 8B illustrates an optical time domain reflectometer (OTDR) or optical return loss (ORL) meter coupled with the OCS system which can be used for automated diagnosis of the fiber-optic network fabric loss and return loss according to aspects of this disclosure.

FIG. 8B illustrates a schematic view of a system 800. System 800 can be an optical time domain reflectometer (OTDR) meter or optical return loss (ORL) meter coupled with the OCS system for automated diagnosis of the fiber-optic network fabric loss and return loss.

System 800 can an OCS 810, including collimators 812 and 814, link diagnostic systems (LDS) 816 and 818, and a OCS front panel 820. Collimators 812 and 814 can be similar to those described with reference to FIGS. 1-5. Collimators 812 and 814 can be optically or data connected with LDS 816 and LDS 818 respectively. Collimators 812 and 814 can be connected to one another through an internal optical path such as that described in FIG. 4. Each collimator can be connected through an OCS front panel 820 to input and output ports. OCS front panel 820 can contain a number of input ports and output ports, similar to input ports 601-607 and output ports 611-617 described with reference to FIG. 6. LDS 816 and LDS 818 can be similar to LDS 890.

Each input and output port can be connected to an optical circulator, such as circulators 840 and 850, through the optical circulator's bidirectional port. Circulator 840 and 850 can be similar to circulator 790. The unidirectional input and output port of circulators 840 and 850 can be connected to a transceiver, such as transceivers 860 and 870. In some examples, the transceiver can have a dedicated transmitter connected to the input port of a circulator and a dedicated receiver, connected to the output port of a circulator. Although examples are given with respect to an optical circulator, other functionally equivalent optical components such as a splitter/combiner or a device with equivalent functionality can be used. In other examples, the use of a circulator can be avoided and a connection to two OCS ports can be used, In some examples, LDS 816 or 818 can be attached through input ports or output ports on the front panel. However, this can increase certain types of noise due to connector insertion or return loss, leading to more variability in performance and calibration.

As one example, such as in an optical return loss (ORL) meter, a laser within LDS 816 or 818 can generate light which is transmitted through coupler 894, to collimator A or B, through an OCS core, through OCS front panel 820, and through circulators 840 or 850, and to transceivers 860 or 870. A portion of the light generated by the LDS 816 or 818 will be reflected backwards along the optical path, causing the light to be transmitted in the reverse direction from the point at which the reflection occurred. Within the LDS, the forward photodiode can be used to monitor the power of the laser, which can vary over time, while the reverse photodiode can be used to monitor the amount of signal which is received through reflections along the path. The transmitted portion of transceiver 860 and 870 can be turned off to avoid additional signal from interfering as it will mask reflection signals. In other examples, a small calibration signal can first be sent from the transceiver to ensure that the photodiodes and system are properly calibrated or to measure insertion loss along an optical path, such as from a transceiver to an LDS, as described herein.

In another example, such as in an OTDR implementation, the LDS used can be similar as described above, but the circuit driving a laser within an LDS would be pulsed and the reverse photodiode receiver circuit would require waveform capture capability to analyze time dependent reflections as compared to only a direct current (DC) signal measurement in the ORL meter described above. The additional time dependent information allows accurate determination of reflection location in addition to amplitude, facilitating subsequent repairs and maintenance.

In addition to ORL measurement, LDS 816 or LDS 818 can allow for measurement of insertion loss along the various paths from an OCS to the receiver of a transceiver and from the transmitter of a transceiver to the OCS. For measurement of transmit path loss, the transmitter of transceiver 860 or transceiver 870 would be turned ON, with light propagating through a circulator, through the fiber-optic cable, through the OCS core, to a reverse photodiode of the an LDS where the received power is measured. As most modern-day optical transceivers feature monitoring of the transmitter power at the transceiver, known as transmit power monitoring (TPM), the difference between received power at the reverse photodiode and TPM would indicate path loss. The excess loss of the LDS and OCS can be calibrated out of the mentioned path loss for higher accuracy. For the measurement of "receive" path loss, the transceiver transmitter would be turned OFF to eliminate reflection signals and the LDS laser would be turned ON. LDS laser light can then propagate through an OCS core, to the external environment, and reach the receiver of the transceiver.

Analogously, optical receivers feature monitoring of the receiver power at the transceiver, known as receive signal strength indicator (RSSI), with the difference between transceiver received power and LDS laser power indicating the receive path loss. The excess loss of the LDS and OCS can be calibrated out of the aforementioned difference for higher accuracy.

Once the above return/transmit path/receive path loss characterization is done, the OCS internal path would then be switched to a different link/path for its characterization. This step can be achieved through the use of processors described above with reference to FIGS. 1 to 5. Characterization of multiple paths could be done in parallel with multiple LDS units.

In some examples, multiple LDS can be used at various points within an OCS to allow for redundancy, parallelism, increased data sources, and for faster system diagnosis and measurements. In some examples, multiple LDS systems can be used in parallel depending on the size of the OCS front panel.

Figure 8C:
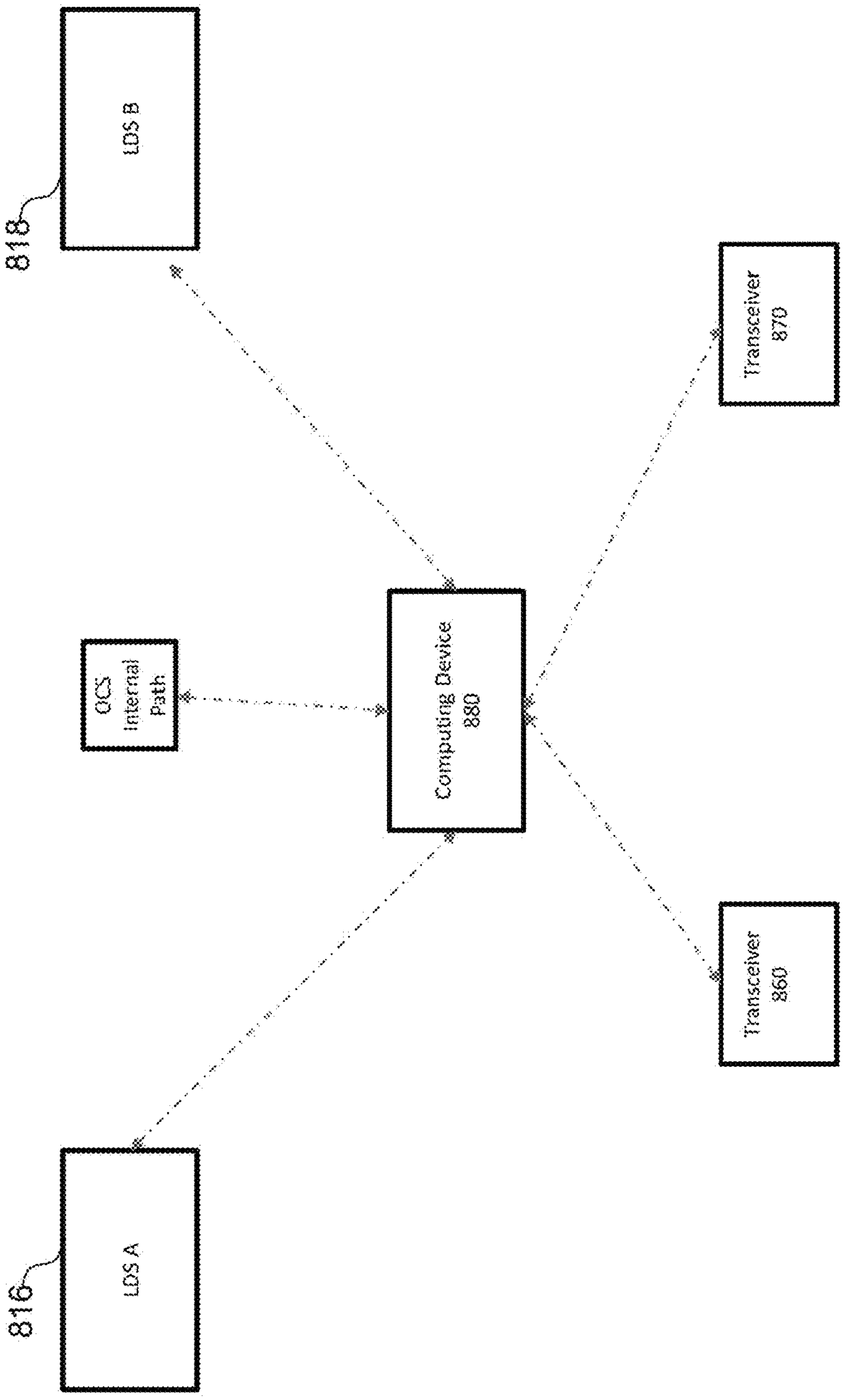
FIG. 8C illustrates an example computing system.

FIG. 8C illustrates a schematic diagram of a computing system 880 in data connectivity with various components, such as transceivers 860 and 870, LDS 816, LDS 818, and optical core. A computing system can be any computer, processing unit, laptop, desktop, server, or other specially designed hardware to perform computations, store data, and enable connectivity between other computing devices and electronic components. Computing system 880 can contain any of the functionality described with respect to FIG. 1, such as without limitation, OCS control system 160, processors 161, memory 162, instructions 163, and data 164. Computing system 880 can be used to automate diagnosis of an OCS system according to aspects of the disclosed technology. Computing system 880 can also contain communication interfaces, such as Bluetooth, internet, infrared, wireless, NFC, serial port, or wired data connection to communicate amongst and between electronic components and other computing devices.

Figure 9:
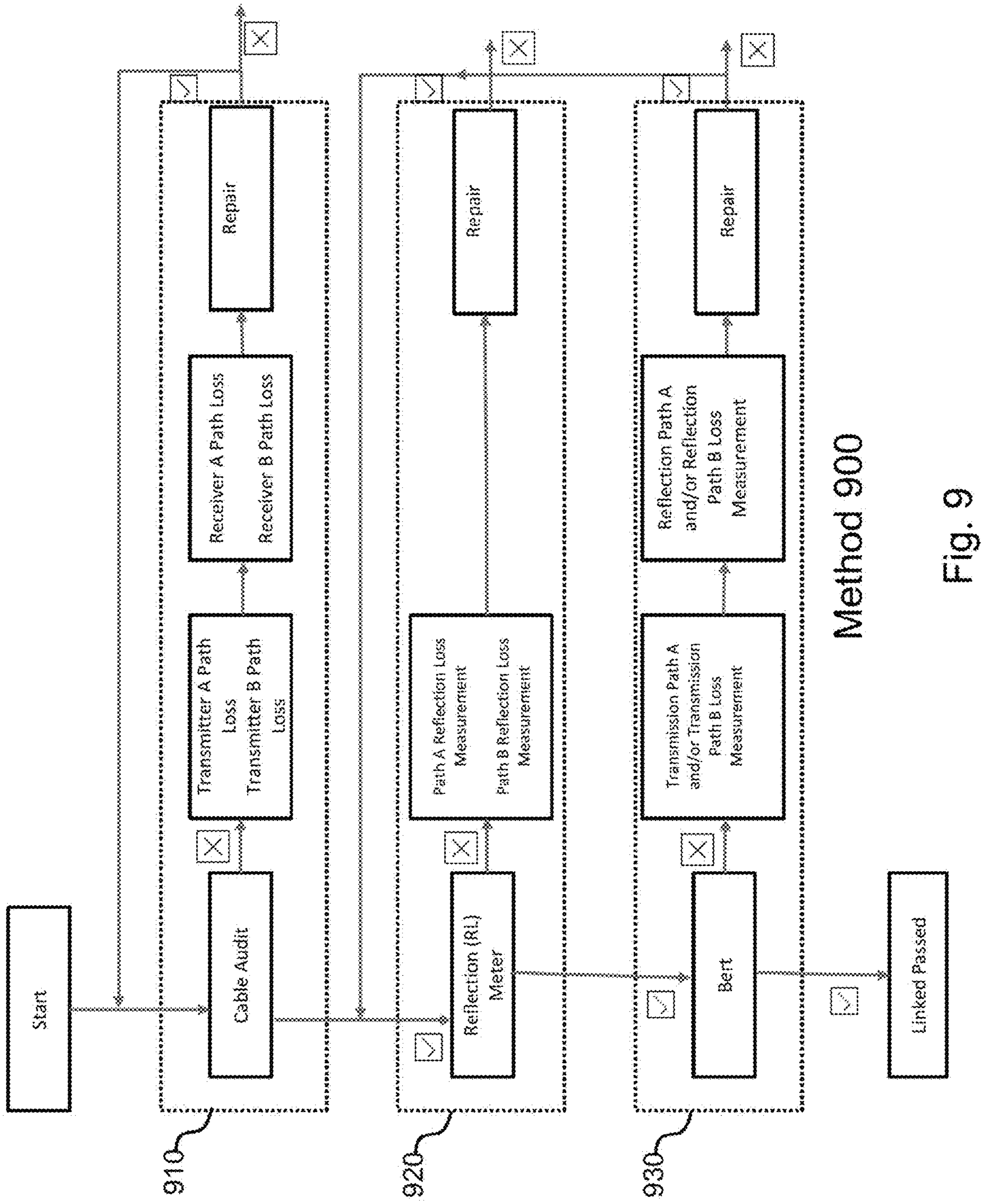
FIG. 9 illustrates an example method which can be used to diagnose and qualify links according to aspects of this disclosure.

FIG. 9 illustrates an example method 900 which can be used to diagnose and qualify optical links. Arrows between blocks represent example sequences in which blocks can be executed. However, the steps can occur in parallel, or in other sequences and orders. Method 900 can occur on processors, such as processor 161 or computing system 880 described above. As illustrated in FIG. 9, a checkmark (✓) can indicate a particular step, test, or block to pass while an "X" can indicate that a particular step, test, or block has not passed or failed. As illustrated in FIG. 9, if every test passes, method 900 can proceed to "linked passed", indicating that the optical link has been diagnosed and passed.

At block 910, a cable audit can take place. A cable audit can represent a quick check of communication integrity between an optical link A cable audit can be a process wherein communication is established by sending packets of information in both directions for a short period of time, to check that the link works. At block 910, transmission path losses between two different paths can be measured if the cable audit fails. In some examples, the first path can be formed through a first collimator of an OCS and a second path can be formed through a second collimator of an OCS Similarly, at block 910, path losses can be measured on both the first path and the second path if the cable audit fails. If the path losses are determined to be high or transmission to be low, a repair may be required of the optical link or OCS system. A repair can occur, after which the cable audit can be repeated. If the cable audit passes, block 920 can follow. In some examples, "pass" can be defined as being successful packet communication. In other examples, "pass" can be defined by a particular criterion or set of criteria, such as, for example, one related to a specific signal quality. For example, the signal quality could be a bit error rate which is to be achieved.

In some examples, a particular repair of the optical system can be established or determined based on the particular problem detected, signature, symptom, or test being performed. In some examples, every possible optical path connected to the LDS can be measured. In this example, a table of data can be generated which can be stored, correlated, and utilized for analysis for each path in the 1×N paths of the OCS.

At block 920, optical return losses can be measured. At this block, return losses for two different paths can be determined. As described above, the first path and the second path can be formed through different fiber collimators.

At block 930, a bit error rate test (BERT) can occur. In some examples, the BERT can be more thorough and a more detailed test than those occurring in block 910 and 920.

After block 930, if all the blocks are determined to pass, the link can be determined to pass.

In some examples, blocks 910 to 930 can be configured to proceed sequentially in an automated manner when a repair is not required. In some examples, both transmission path losses (A and B) can be measured simultaneously. In other examples, a reflection path loss can be excluded from the blocks described with reference to FIG. 9. In other examples, a reflection path loss can be included in a particular block after a repair has occurred on a particular segment.

Although method 900 is described above with use of the LDS with a fiber-optic network which implements circulators for bidirectional communication, the same methods of diagnosis can be applied to a network with no circulators, such as for example, in a system in which bidirectional communication is achieved through two fiber-optic paths.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A system, comprising:

an optical circuit switch (OCS), comprising:

- a first fiber collimator and a second fiber collimator;
- an OCS internal optical path coupling the first and second fiber collimators;
- an optical circulator having a bidirectional port optically coupled to a port of the second fiber collimator; and
- a first transceiver optically coupled to the optical circulator, a link diagnostic system, comprising:

- a first photodetector,
- a second photodetector,
- an optical coupler, and
- a light source; and wherein:

- the OCS is optically coupled to the link diagnostic system,
- the optical coupler splits an optical signal from the light source such that a first portion of the optical signal is routed to the OCS and a second portion of the optical signal is routed to the second photodetector as a control signal,
- the first photodetector is optically coupled to the optical circulator to receive a reflected portion of the optical signal routed back from the OCS internal optical path, and
- a signal obtained from the first photodetector is compared to the control signal obtained at the second photodetector to detect signal loss.

2. The OCS of claim 1, wherein the optical coupler couples the light source to the second photodetector.

3. The OCS of claim 1, further comprising a plurality of optical circulators optically coupled to a plurality of ports of the first fiber collimator and a plurality of ports of the second fiber collimator.

4. The OCS of claim 3, the plurality of the ports of the first fiber collimator comprising N input ports, the plurality of the ports of the second fiber collimator comprising N output ports, and 2N optical circulators optically coupled and in one to one correspondence with the N input ports and N output ports.

5. The OCS of claim 1, further comprising a second link diagnostic system, the second link diagnostic system comprising a first photodetector, a second photodetector, a light source, and an optical coupler.

6. The OCS of claim 1, further comprising microelectromechanical system (MEMS) mirrors.

7. A link diagnostic system, comprising:

- a first photodetector and a second photodetector;
- a light source; and
- an optical coupler, coupling the light source to the second photodetector to provide a control signal, wherein

- the first photodetector is optically coupled to an optical circulator of an optical circuit switch (OCS) and configured to receive a reflection signal routed back from an internal optical path of the OCS, and
- a signal received by the second photodetector is used as the control signal to determine signal loss in the internal optical path based on a comparison with the reflection signal.

8. The link diagnostic system of claim 7, wherein the first photodetector is optically coupled to the OCS.

9. The link diagnostic system of claim 8, wherein the OCS comprises:

- a first fiber collimator and a second fiber collimator;
- the internal path coupling the first and second fiber collimators;
- the optical circulator having a bidirectional port optically coupled to a port of the second fiber collimator; and
- a first transceiver optically coupled to the optical circulator.

10. The link diagnostic system of claim 9, wherein the internal path further comprises a fiber input to the first fiber collimator, the internal path, and the port of the second fiber collimator.

11. The link diagnostic system of claim 8, wherein the light source is configured to generate an optical time domain light signal.

12. The link diagnostic system of claim 11, wherein the link diagnostic system is configured to determine a location of a source of the signal loss along the internal path based on the reflection signal.

13. The link diagnostic system of claim 11, wherein the link diagnostic system is configured to determine an amount of signal loss across the internal path based on the reflection signal.

14. A method of detecting signal loss in an optical fiber system, the method comprising:

- generating, by a light source, an optical signal;
- splitting, by an optical coupler, the optical signal into a transmission portion of the optical signal and a control portion of the optical signal;
- transmitting the transmission portion of the optical signal through at least a portion of an internal optical path of an optical circuit switch (OCS);
- receiving at a control photodetector the control portion of the optical signal;

receiving a portion of the transmission portion of the optical signal at an optical circulator;

receiving at a first photodetector a reflected portion of the transmission portion of the optical signal; and detecting signal loss based on a comparison of the control portion of the optical signal received at the control photodetector and the reflected portion of the optical signal.

15. The method of claim 14, further comprising forming the internal optical path, the internal optical path comprising a fiber input to a first fiber collimator.

16. The method of claim 15, wherein the internal optical path further comprises a port of a second fiber collimator and the optical circulator.

17. The method of claim 14, wherein the first photodetector is optically coupled to the optical circulator.

18. The method of claim 14, further comprising:

determining, based on the reflected portion of the optical signal, a location of a source of the detected signal loss in the optical fiber system; or determining, based on the reflected portion of the optical signal, an amount of signal loss across the optical fiber system.

* * * * *